United States Patent
Hsiao et al.

(10) Patent No.: US 7,525,760 B2
(45) Date of Patent: Apr. 28, 2009

(54) LAMINATED WRITE GAP TO IMPROVE WRITER PERFORMANCE

(75) Inventors: Wen-Chien Hsiao, San Jose, CA (US); Terence Lam, Cupertino, CA (US); Bernd Lamberts, Cupertino, CA (US); Yinshi Liu, Foster City, CA (US); Terry Olson, Santa Cruz, CA (US); Michael Yang, San Jose, CA (US); Samuel Yuan, Saratoga, CA (US)

(73) Assignee: Hitachi Global Storage Technologies B.V., Amsterdam (NL)

( * ) Notice: Subject to any disclaimer, the term of this patent is extended or adjusted under 35 U.S.C. 154(b) by 243 days.

(21) Appl. No.: 11/104,333

(22) Filed: Apr. 11, 2005

(65) Prior Publication Data

US 2006/0227456 A1 Oct. 12, 2006

(51) Int. Cl.
G11B 5/235 (2006.01)
(52) U.S. Cl. .................................. 360/119.07
(58) Field of Classification Search ............... 360/119, 360/120, 126, 317, 119.01, 119.02, 119.03, 360/119.04, 119.05, 119.06, 119.07, 119.08, 360/119.09, 119.1, 119.11
See application file for complete search history.

(56) References Cited

U.S. PATENT DOCUMENTS

| | | | | |
|---|---|---|---|---|
| 4,180,835 A | * | 12/1979 | Okumura et al. | 360/118 |
| 4,742,412 A | * | 5/1988 | Kuriyama | 360/119.11 |
| 4,768,118 A | * | 8/1988 | Kuriyama | 360/121 |
| 4,780,779 A | * | 10/1988 | Pisharody et al. | 360/120 |
| 4,825,318 A | * | 4/1989 | Hoo et al. | 360/121 |
| 5,001,589 A | | 3/1991 | Rask et al. | 360/120 |
| 5,111,352 A | * | 5/1992 | Das et al. | 360/321 |
| 5,157,570 A | * | 10/1992 | Shukovsky et al. | 360/126 |
| 5,173,822 A | | 12/1992 | Kuriyama et al. | 360/120 |
| 5,210,668 A | * | 5/1993 | Sillen et al. | 360/120 |
| 5,537,278 A | * | 7/1996 | Yaegashi et al. | 360/126 |
| 5,558,944 A | | 9/1996 | Terunuma | 428/611 |
| 5,621,595 A | | 4/1997 | Cohen | 360/126 |
| 5,729,413 A | * | 3/1998 | Gooch et al. | 360/119.07 |

(Continued)

FOREIGN PATENT DOCUMENTS

JP 2002140803 5/2002

(Continued)

OTHER PUBLICATIONS

Thomson Delphion; Use of Tantalum to Control the Soft Magnetic Properties of Permalloy Pole Tip P2 in Inductive Heads; Oct. 1993; IBM Technical Disclosure Bulletin.

*Primary Examiner*—Angel A. Castro

(57) ABSTRACT

Embodiments of the present invention recite a write gap structure for a magnetic recording head. In one embodiment, the write gap structure comprises at least one layer of inert material is disposed proximate to the P2 pole of a magnetic recording head. A layer of magnetic material is disposed between the layer of inert material and the P1 pedestal (P1P) of the magnetic recording head. In embodiments of the present invention, the write gap structure further comprises a second layer of inert material is disposed between the layer of magnetic material and the P1P of the magnetic recording head. In embodiments of the present invention, the write gap structure only overlies a portion of the write gap of the magnetic recording head with reference to the throat height dimension of the write gap.

11 Claims, 7 Drawing Sheets

U.S. PATENT DOCUMENTS

| | | | |
|---|---|---|---|
| 5,812,350 A | 9/1998 | Chen et al. ............... 360/126 |
| 6,091,582 A | 7/2000 | Komuro et al. ........... 360/126 |
| 6,301,075 B1 | 10/2001 | Sato ........................ 360/126 |
| 6,456,461 B1 | 9/2002 | Sato ........................ 360/126 |
| 6,538,846 B1 | 3/2003 | Sato ........................ 360/126 |
| 6,600,629 B2 | 7/2003 | Kanada et al. ........... 360/120 |
| 6,624,972 B1 * | 9/2003 | Nishida et al. ........ 360/119.07 |
| 6,724,572 B1 * | 4/2004 | Stoev et al. .............. 360/126 |
| 6,731,458 B2 * | 5/2004 | Watanabe et al. ......... 360/126 |
| 6,751,053 B2 | 6/2004 | Watanabe et al. ......... 360/126 |
| 6,801,393 B2 | 10/2004 | Oki et al. .................. 360/126 |
| 6,833,976 B2 * | 12/2004 | Hsu et al. ............. 360/119.07 |
| 6,851,178 B2 * | 2/2005 | Han et al. ............... 29/603.07 |
| 6,999,276 B2 * | 2/2006 | Kanada et al. ............. 360/126 |
| 7,086,139 B2 | 8/2006 | Lee et al. |
| 7,133,241 B2 | 11/2006 | Che et al. |
| 2003/0202278 A1 * | 10/2003 | Chen et al. ................. 360/126 |
| 2003/0214753 A1 | 11/2003 | Hsu et al. ................... 360/119 |
| 2004/0027716 A1 * | 2/2004 | Chen et al. ................. 360/126 |
| 2004/0179296 A1 * | 9/2004 | Sato ........................... 360/126 |
| 2005/0219745 A1 * | 10/2005 | Hixson-Goldsmith et al. .... 360/126 |

FOREIGN PATENT DOCUMENTS

WO      WO 01/33559 A1     5/2001

\* cited by examiner

LAMINATED WRITE GAP TO IMPROVE WRITER PERFORMANCE

FIELD OF THE INVENTION

Embodiments of the present invention are related to the field of magnetic data storage devices.

RELATED APPLICATIONS

This application is related to U.S. patent application, Ser. No. 11/104212 by Wen-Chien Hsiao, Terence Lam, Yinshi Liu, Michael Yang, and Samuel Yuan, filed on the same date as the present application, entitled "Process for Fabricating a Magnetic Recording Head with a Laminated Write Gap" with, and assigned to the assignee of the present invention.

BACKGROUND OF THE INVENTION

The data storage industry strives for innovations to improve areal density of hard disk drives. Improvements can be achieved through changes to the design of the head, the disk, or a combination of the two (e.g., perpendicular head recording).

FIGS. 1A and 1B show front and side views respectively of an exemplary prior art semiconductor fabricated write head 100 used in a disk storage device. Write head 100 comprises an upper pole 110, also known as a "P2" pole, a lower pole 120, also known as a "P1 pedestal," or "P1P", and a write gap 130 disposed between the P1P and P2. Write head 100 further comprises a plurality of coils 140.

FIG. 2 shows the composition of an exemplary prior art write gap 130 associated with the write head. Typically, write gap 130 comprises one or more layers of a magnetically inert material disposed between the P2 (110) and P1P (120) poles. For example, in FIG. 2, a first inert layer 210 is a layer of Rhodium which is approximately 900 angstroms (900 A) thick disposed above a second inert layer 220 of Tantalum which is approximately 100 angstroms (100 A) thick. In other prior art implementations, write gap 130 may comprise a layer of alumina, which is disposed between P2 (110) and P1P (120).

Returning now to FIGS. 1A and 1B, in operation, the surfaces of P2 (110) and P1P (120) adjacent to the gap (130) are saturated to generate a magnetic field which magnetizes a recording medium (e.g., a magnetic disk). It is typically desired to maximize the magnetic flux density in the write gap to improve writing efficiency. However, when saturating write gap 130, additional or "stray" magnetic fields are created in regions 150 and/or 160 of the P1P (120). These additional magnetic fields can be problematic because they comprise a weak, unreadable signal which cannot reliably store magnetic charges on the recording medium. However, they can interfere with the storage of data on adjacent recording tracks of the recording medium by partially overwriting, or even erasing, the data on the adjacent tracks.

This is shown more clearly in FIG. 3, which shows the orientation of an exemplary prior art write head 100 relative to recording tracks of a recording medium. As shown in FIG. 3, write head 100 is disposed at an angle relative to direction of recording tracks 310, 320, and 330 and, when in operation, recording tracks move in the direction indicated by arrow 340. As shown in FIG. 3, each of the recording tracks comprises a write track (e.g., 311, 321, and 331 respectively) as well as erase bands (e.g., 310a, 310b, 320a, 320b, 330a and 330b respectively) which are adjacent to their respective write tracks.

As described above, when the surfaces of P2 (110) and P1P (120) are saturated, regions 150 and/or 160 may also emit a magnetic field. As shown in FIG. 3, region 150 overlies erase band 310b and generates a magnetic field, which magnetizes some regions in erase band 310b. The magnetic field generated in region 160 actually overlies write band 311. However, it is overwritten by the stronger magnetic field generated by write gap 130 as the recording track moves beneath write head 100.

Because the erase bands can interfere with data storage in adjacent recording tracks, a certain amount of offset (e.g., 350) between recording tracks, also referred to as "pitch" is typically provided. However, the extra space required to provide this offset between tracks disadvantageously reduces the density of data which can be stored on the magnetic disk.

SUMMARY OF THE INVENTION

Accordingly, it would be advantageous to create a magnetic recording or write head which reduces adjacent track interference in magnetic storage devices without significantly reducing the write efficiency of the magnetic recording head for the intended track. While meeting the above stated need, it is desirable that structures aimed at reducing the above problem can be reliably and economically fabricated.

Embodiments of the present invention recite a write gap structure which reduces the generation of magnetic fields in the erase band. As a result, smaller (e.g., more narrow) erase bands are created and recording tracks can be spaced more closely, thus increasing data storage density in magnetic disks.

Embodiments of the present invention are drawn to write gap structures for a magnetic recording head. In one embodiment, the write gap structure comprises at least one layer of inert material is disposed proximate to the P2 pole of a magnetic recording head. A layer of magnetic material is disposed between the layer of inert material and the P1 pedestal (P1P) of the magnetic recording head. In embodiments of the present invention, the write gap structure further comprises a second layer of inert material is disposed between the layer of magnetic material and the P1P of the magnetic recording head. In embodiments of the present invention, the throat height of the write gap structure is reduced with reference to the throat height of the magnetic recording head.

In embodiments of the present invention, the layer of magnetic material in the write gap structure draws magnetic flux away from regions of the magnetic recording head which overlie the erase bands of the recording medium when the magnetic recording head is in operation. As a result, smaller erase bands are created and recording tracks can be spaced more closely, thus increasing the data storage density of the magnetic disk.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Embodiments of the present invention comprise a write gap structure for a magnetic recording head. In one embodiment, the write gap structure comprises a layer of inert material which is disposed proximate to the P2 pole of a magnetic recording head and a layer of magnetic material which is disposed between the layer of inert material and the P1 pedestal (P1P) of the magnetic recording head. In embodiments of the present invention, the layer of inert material may comprise a laminate of inert layers.

In another embodiment of the present invention, the write gap structure comprises a first layer of inert material which is disposed proximate to the P2 pole of a magnetic recording head, a second layer of inert material is disposed proximate to the P1P of the magnetic recoding head, and a layer of magnetic material which is disposed between the inert layers. In embodiments of the present invention, the first inert layer may comprise a laminate of inert layers.

Embodiments of the present invention reduce the generation of magnetic fields in the erase band region of a magnetic recording medium when the magnetic recording head is in operation. As a result, greater data storage density may be realized because the pitch between adjacent recording tracks may be reduced. In embodiments of the present invention, the write gap structure may only overlie a portion of the write gap of the magnetic recording head with reference to the throat height dimension of the write gap. Furthermore, this dimension of the write gap structure may vary according to the desired performance parameters for the magnetic recording head.

Figure 4B:
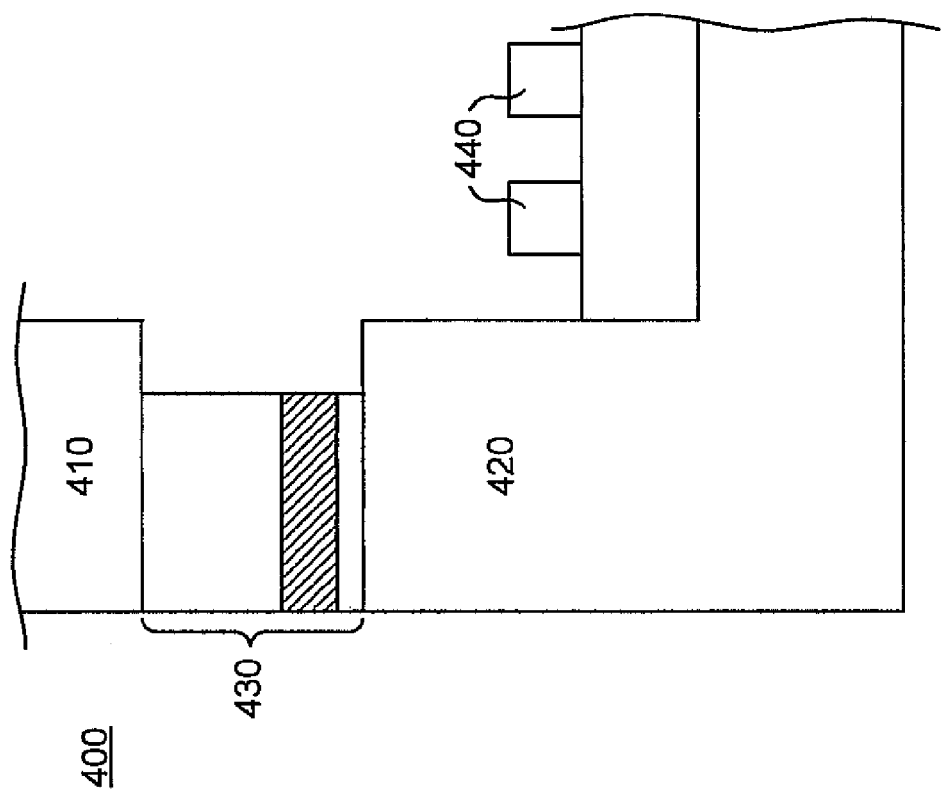
FIGS. 4A and 4B are front and side views respectively of an exemplary write head in accordance with embodiments of the present invention.
Figure 4A:
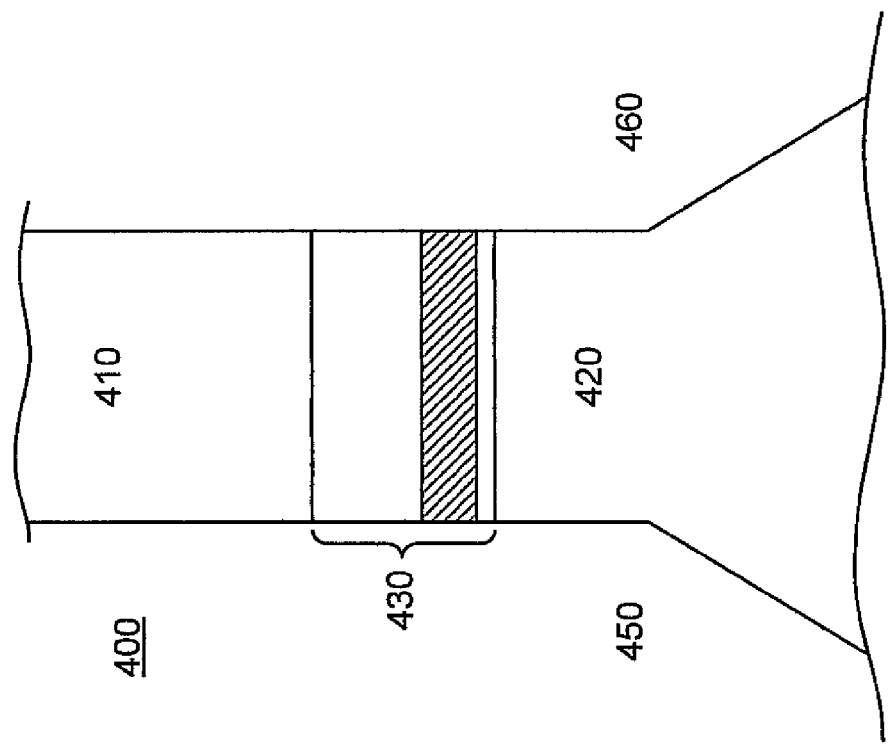

FIGS. 4A and 4B are front and side views respectively of an exemplary magnetic recording head 400 in accordance with embodiments of the present invention. In embodiments of the present invention, the magnetic recording head comprises a P2 pole 410, a P1P 420, a write gap structure 430, as well as a plurality of coils 440. It is noted that other components of magnetic recording head 400 are omitted for clarity. In the embodiment of magnetic recording head 400, write gap structure 430 is a laminated write gap structure comprising at least one layer of magnetic material and at least one layer of an inert material. This is shown in greater detail in FIG. 5 which shows a front view of write gap structure 430 in accordance with embodiments of the present invention.

Figure 5:
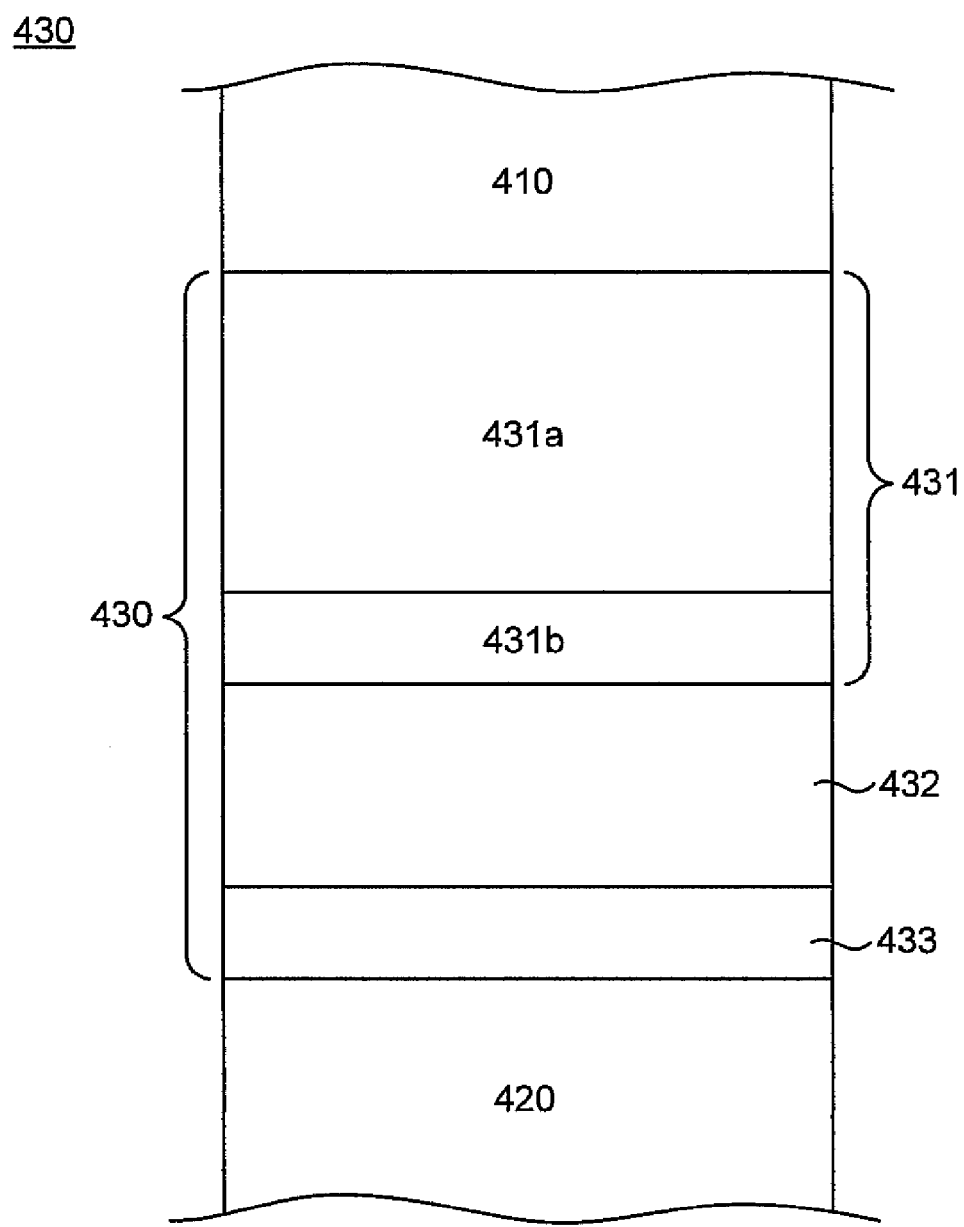
FIG. 5 shows a front view of a write gap structure in accordance with embodiments of the present invention.

In FIG. 5, write gap structure 430 comprises a first layer of inert material 431 which is disposed proximate to P2 pole 410. In the present embodiment, first inert layer 431 comprises a laminate layer 431a and a laminate layer 431b. In one embodiment of the present invention, laminate layer 431a comprises a layer of rhodium (Rh) and laminate layer 431b comprises a layer of tantalum (Ta). While the present embodiment recites these materials specifically, it is appreciated that other inert materials may be utilized in first inert layer 431 in other embodiments of the present invention.

Figure 1B:
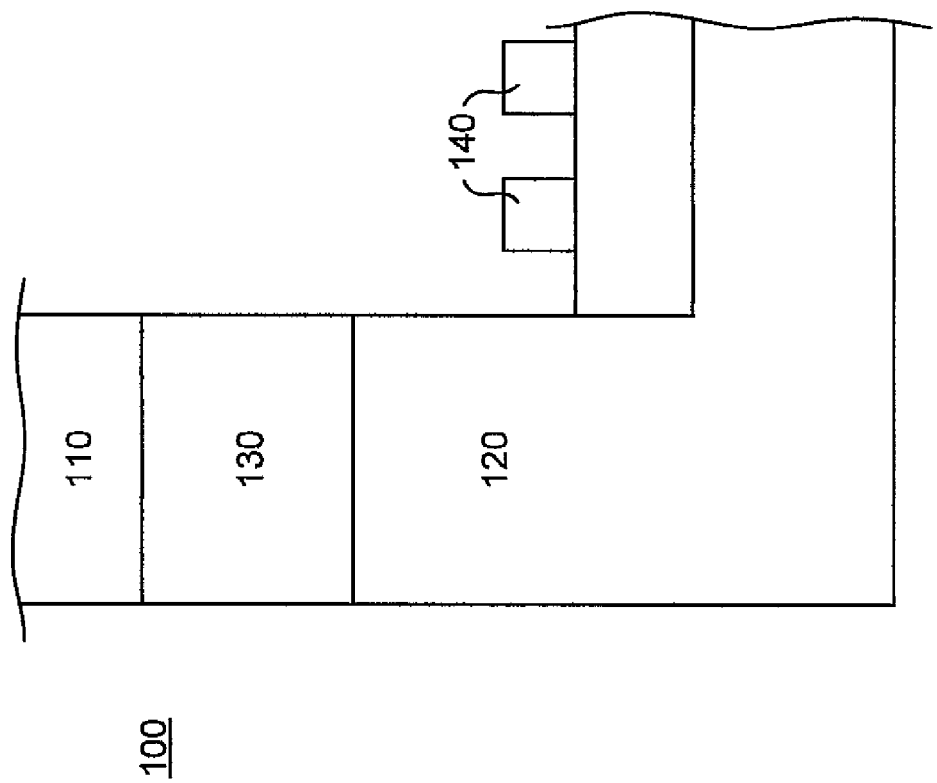
FIGS. 1A and 1B show front and side views respectively of an exemplary prior art write head.
Figure 1A:
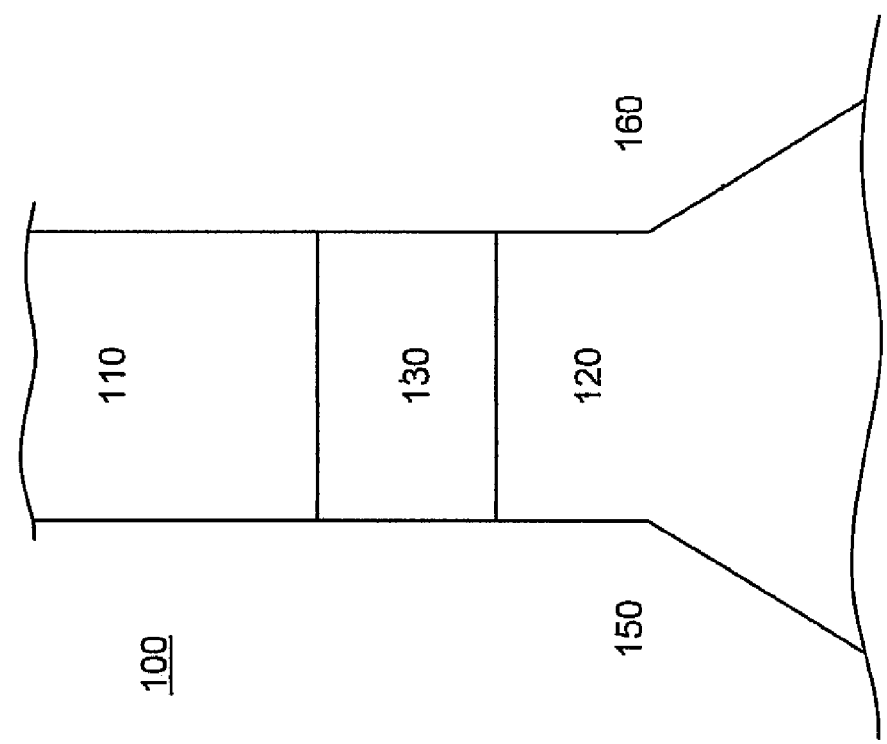
Figure 2:
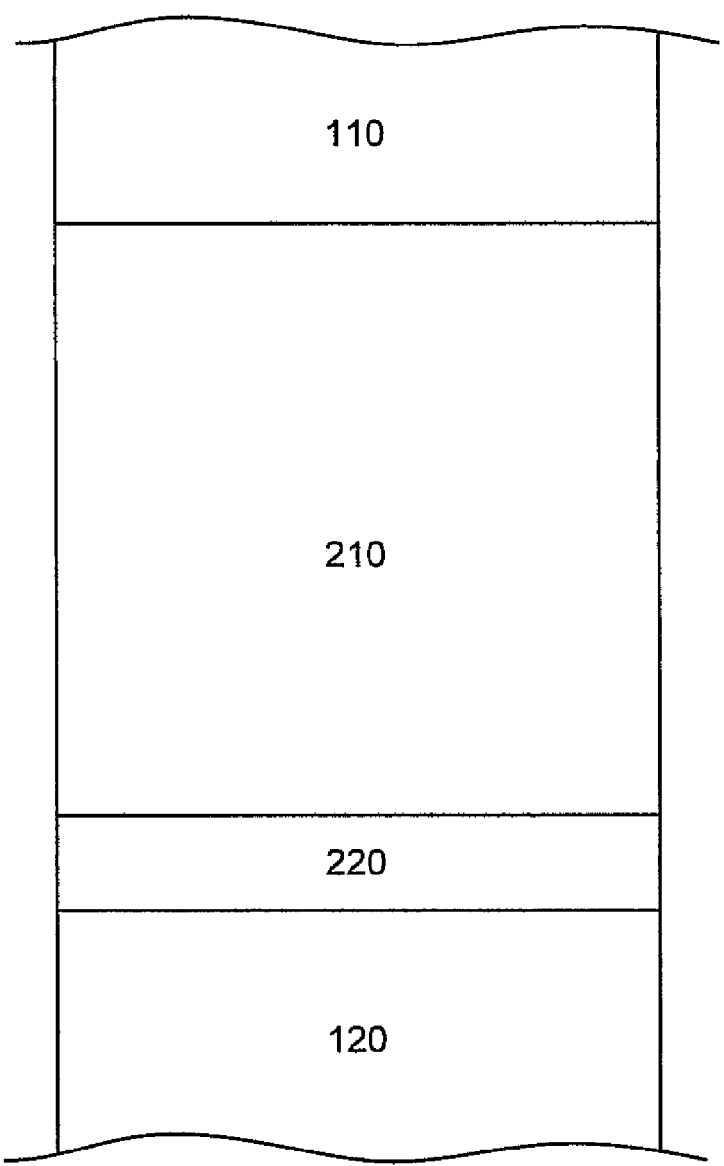
FIG. 2 shows the composition of an exemplary prior art write gap.
Figure 3:
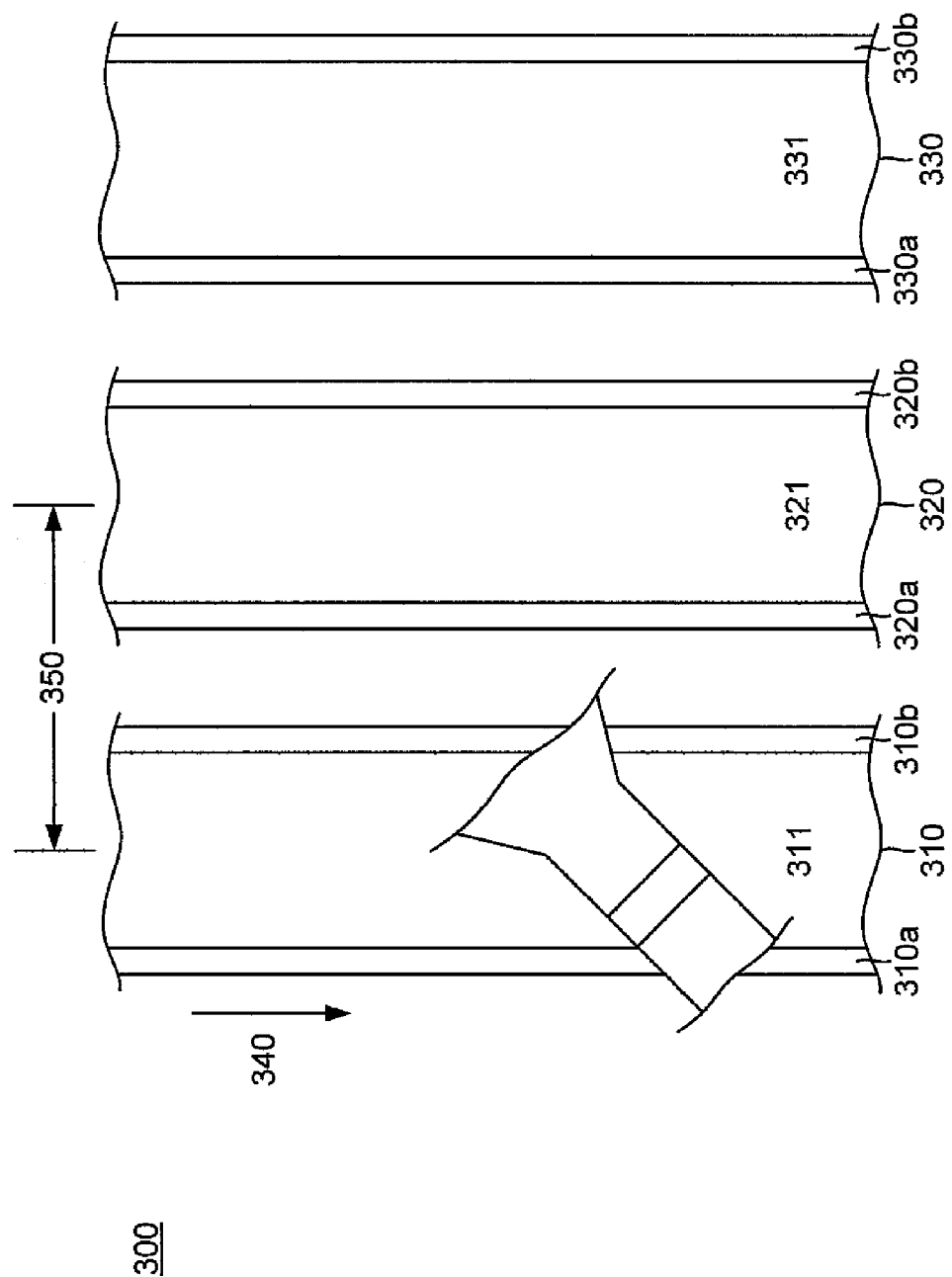
FIG. 3 shows the orientation of an exemplary prior art write head relative to write tracks.

In the present embodiment, write gap structure 430 further comprises a layer of magnetic material 432 disposed between first inert layer 431 and P1P 420. In the embodiment of FIG. 5, magnetic material layer 432 comprises cobalt iron (CoFe). While the present embodiment recites a layer of cobalt iron, embodiments of the present invention are well suited to utilize other magnetic materials in magnetic material layer 432. In embodiments of the present invention, magnetic material layer 432 is for drawing magnetic flux away from fields which may form in regions 450 and/or 460 of magnetic recording head 400. In other words, magnetic material layer 432 facilitates reducing the adjacent track interference in the data region of adjacent track(s) (e.g., 321 in FIG. 3) while substantially maintaining the magnetic flux density in the write gap. In a conventional implementation which does not use the laminated structure of the present invention, achieving a similar level of reduction in the adjacent track interference would necessitate a substantial reduction of the magnetic flux density in the write gap, thus reducing the writing efficiency of magnetic recording head 400. However, embodiments of the present invention can substantially reduce adjacent track interference without necessitating a substantial reduction in the flux density in the write gap.

In the present embodiment, write gap structure 430 further comprises a second inert layer 433 which is disposed between magnetic material layer 432. In the present embodiment, second inert layer 433 comprises a layer of rhodium (Rh). While the present embodiment specifically recites second inert layer 433 as comprising a layer of rhodium in one example, embodiments of the present invention are well suited to utilize other inert materials for second inert layer 433.

In embodiments of the present invention, write gap 430 is approximately one thousand angstroms (1000 A) high. In the embodiment of FIG. 5, first laminate layer 431a is a layer of rhodium which is approximately five hundred angstroms (500 A) thick and second laminate layer 431b is a layer of tantalum which is approximately one hundred angstroms (100 A) thick. In the embodiment of FIG. 5, magnetic material layer 432 is a layer of cobalt iron which is approximately three hundred angstroms (300 A) thick and second inert layer 433 is a layer of rhodium which is approximately one hundred angstroms (100 A) thick. While the present embodiment recites these dimensions specifically, it is appreciated that other dimensions may be used in other embodiments of the present invention.

Returning to FIG. 4B, in embodiments of the present invention, the throat height of write gap structure 430 is reduced with reference to the throat height of magnetic recording head 400. As shown in FIG. 4B, write gap structure 430 only overlies a portion of the throat height of magnetic recording head 400. For example, in the embodiment of FIG. 4B, the throat height of P1P 420 may be approximately two microns (2.0μ) thick. However, write gap structure 430 is less than two microns (2.0μ) thick (e.g., 0.15μ, 0.30μ, 0.45μ, or 0.60μ). Furthermore, the throat height of write gap structure 430 may be selected according to the desired characteristics for magnetic recording head 400. It is noted that in embodiments of the present invention, the throat height of P2 pole 410 may be different than the throat height of P1P 420.

Figure 6B:
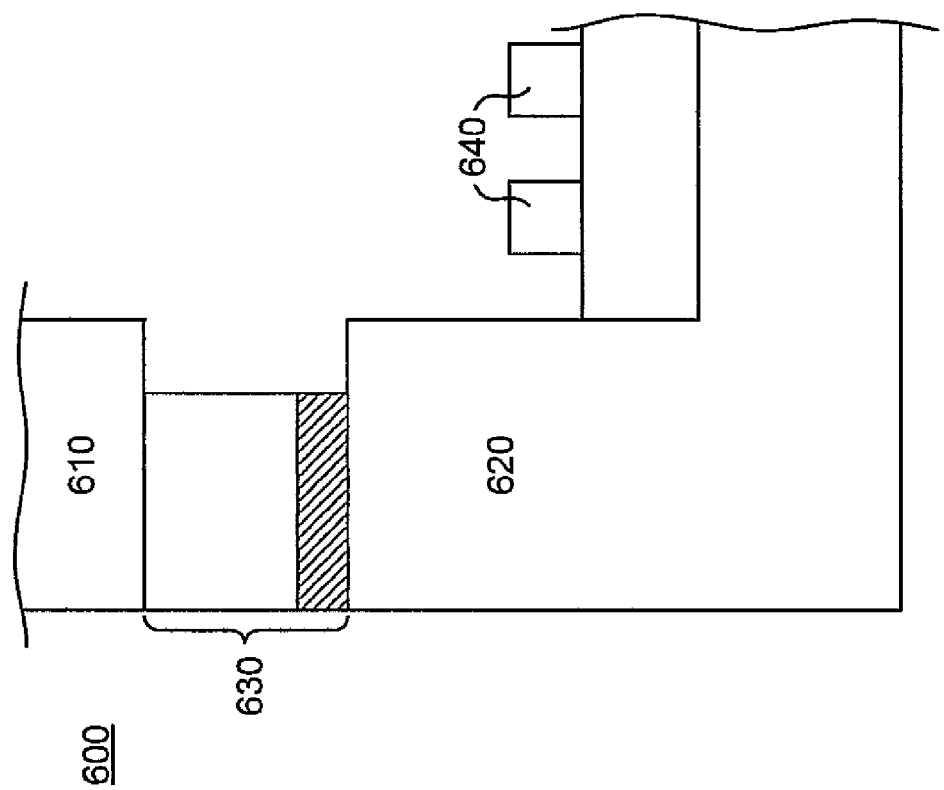
FIGS. 6A and 6B are front and side views respectively of an exemplary write head in accordance with embodiments of the present invention.
Figure 6A:
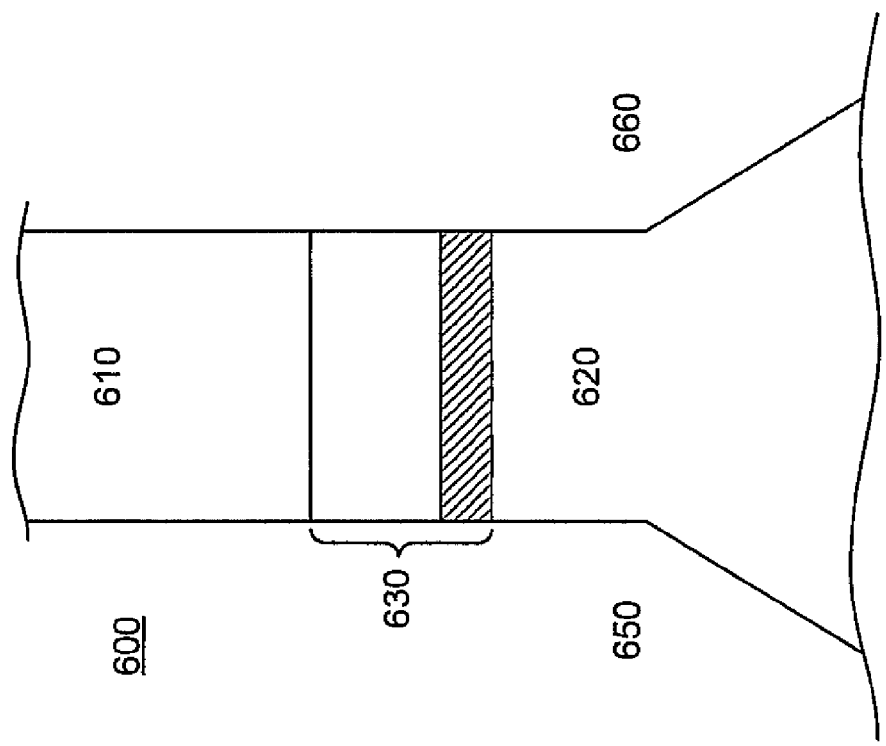

FIGS. 6A and 6B are front and side views respectively of an exemplary magnetic recording head 600 in accordance with embodiments of the present invention. In embodiments of the present invention, the magnetic recording head comprises a P2 pole 610, a P1P 620, a write gap structure 630, as well as a plurality of coils 640. It is noted that other components of magnetic recording head 600 are omitted for clarity. In the embodiment of magnetic recording head 600, write gap structure 630 is a laminated write gap structure comprising at least one layer of magnetic material and at least one layer of an inert material. This is shown in greater detail in FIG. 7 which shows a front view of write gap structure 630 in accordance with embodiments of the present invention.

Figure 7:
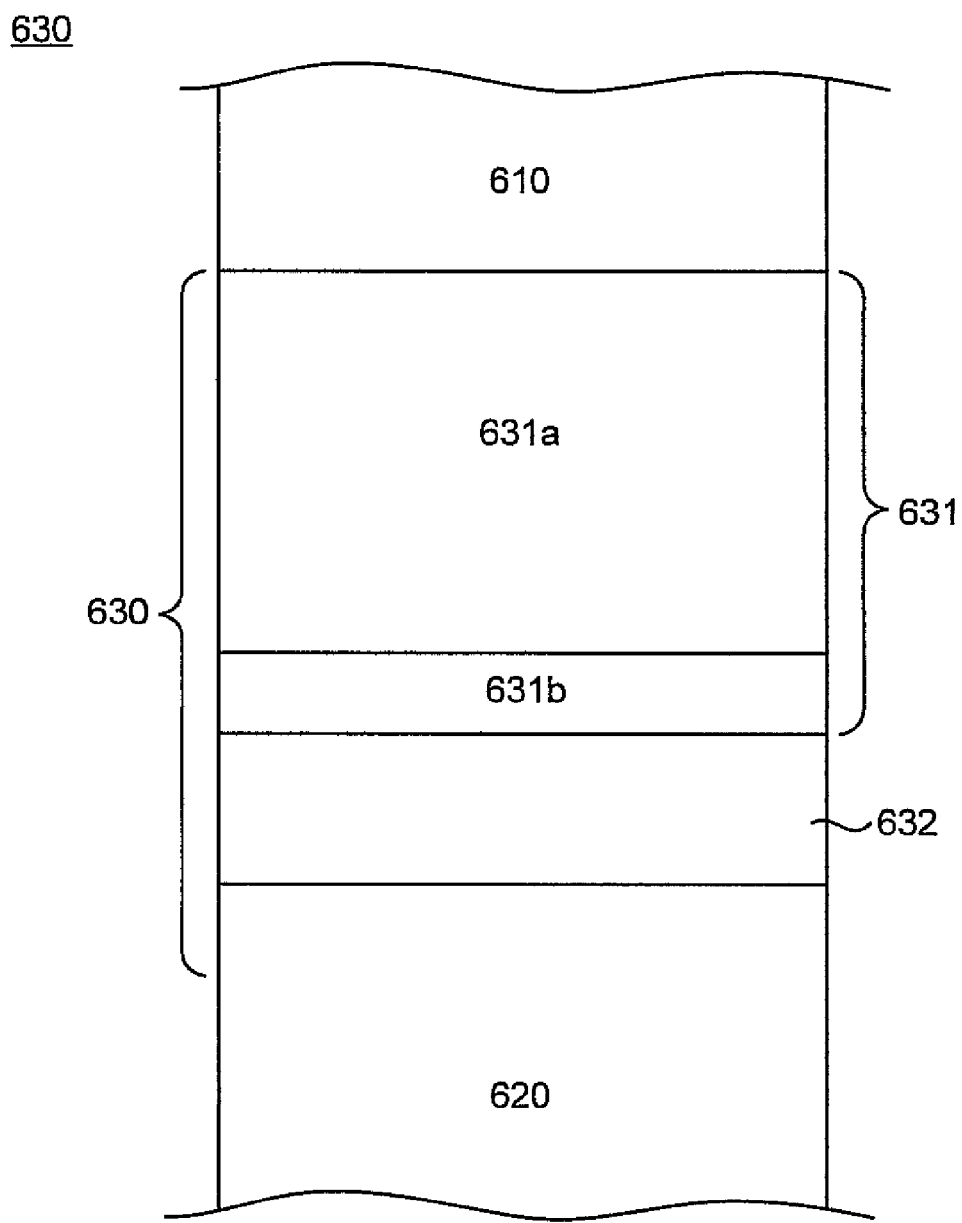
FIG. 7 shows a front view of a write gap structure in accordance with embodiments of the present invention.

In FIG. 7, write gap structure 630 comprises a layer of inert material 631 which is disposed proximate to P2 pole 610. In the present embodiment, inert layer 631 comprises a laminate layer 631a and a laminate layer 631b. In one embodiment of the present invention, laminate layer 631a comprises a layer of rhodium (Rh) and laminate layer 631b comprises a layer of tantalum (Ta). While the present embodiment recites these materials specifically, it is appreciated that other inert materials may be utilized in first inert layer 631 in other embodiments of the present invention.

In the present embodiment, write gap structure 630 further comprises a layer of magnetic material 632 disposed between first inert layer 631 and P1P 620. In the embodiment of FIG. 7, magnetic material layer 632 comprises cobalt iron (CoFe). While the present embodiment recites a layer of cobalt iron, other embodiments of the present invention are well suited to utilize other magnetic materials in magnetic material layer 632. In embodiments of the present invention, magnetic material layer 632 is for drawing magnetic flux away from fields, which may form in regions 650 and/or 660 of magnetic recording head 600. In other words, magnetic material layer 632 facilitates reducing the adjacent track interference in the data region of adjacent track(s) (e.g., 321 in FIG. 3) while substantially maintaining the magnetic flux density in the write gap. In a conventional implementation, which does not use the laminated structure of the present invention, achieving a similar level of reduction in the adjacent track interference would necessitate a substantial reduction of the magnetic flux density in the write gap, thus reducing the writing efficiency of magnetic recording head 600. However, embodiments of the present invention can substantially reduce adjacent track interference without necessitating a substantial reduction in the flux density in the write gap.

In embodiments of the present invention, write gap 630 is approximately one thousand angstroms (1000 A) high. In the embodiment of FIG. 7, first laminate layer 631a is a layer of rhodium which is approximately six hundred angstroms (600 A) thick and second laminate layer 631b is a layer of tantalum which is approximately one hundred angstroms (100 A) thick. In the embodiment of FIG. 7, magnetic material layer 632 is a layer of cobalt iron which is approximately three hundred angstroms (300 A) thick. While the present embodiment recites these dimensions specifically, it is appreciated that other dimensions may be used in other embodiments of the present invention.

Returning to FIG. 6B, in embodiments of the present invention, the throat height of write gap structure 630 is reduced with reference to the throat height of magnetic recording head 600. As shown in FIG. 6B, write gap structure 630 only overlies a portion of the throat height of magnetic recording head 600. For example, in the embodiment of FIG. 6B, the throat height of P1P 620 may be approximately two microns (2.0μ) thick. However, write gap structure 630 is less than two microns (2.0μ) thick (e.g., 0.15μ, 0.30μ, 0.45μ, or 0.60μ). Furthermore, the thickness of write gap structure 630 with reference to the throat height may be selected according to the desired characteristics for magnetic recording head 600. It is appreciated that in embodiments of the present invention, the throat height of P2 pole 610 may be different than the throat height of P1P 620.

Thus, embodiments of the present invention reduce adjacent track interference for magnetic data storage systems without significantly reducing the write efficiency of the magnetic recording head. As a result, the pitch between adjacent recording tracks may be reduced, resulting in greater data storage density. Furthermore, embodiments of the present invention may be fabricated using existing magnetic recording head fabrication equipment and processes. As a result, implementation of embodiments of the present invention can be performed economically and reliably.

The preferred embodiment of the present invention, a laminated write gap to improve writer performance, is thus described. While the present invention has been described in particular embodiments, it should be appreciated that the present invention should not be construed as limited by such embodiments, but rather construed according to the following claims.

What is claimed is:

1. A write gap structure for a magnetic recording head, said write gap structure comprising:
   at least one laminate layer of inert material disposed proximate to pole structure of said magnetic recording head;
   a layer of magnetic material disposed between said at least one layer of inert material and a pedestal of said magnetic recording head; and
   another layer of inert material disposed between said layer of magnetic material and said pedestal of said magnetic recording head wherein said layer of magnetic material comprises a layer of cobalt iron (CoFe) and wherein said at least one laminate layer of inert material comprises a laminate layer of rhodium (Rh) and a laminate layer of tantalum (Ta).

2. The write gap structure of claim 1 wherein said another layer of inert material comprises a layer of rhodium (Rh).

3. The write gap structure of claim 2 wherein said at least one laminate layer of inert material comprises approximately sixty percent (60%) of said write gap structure, said layer of magnetic material comprises approximately thirty percent (30%) of said write gap structure, and said second layer of inert material comprises approximately ten percent (10%) of said write gap structure.

4. The write gap structure of claim 1 having a throat height that is less than the write gap of said magnetic recording head.

5. The write gap structure of claim 1 wherein said layer of magnetic material reduces the generation of magnetic fields in erase bands of a magnetic recording medium proximate to said magnetic recording head when in operation.

6. A magnetic recording head comprising:
   a pole structure;

a pedestal structure;

a laminated write gap structure disposed between said pole structure and said pedestal structure, and wherein said laminated write gap structure comprises at least one magnetic layer;

a first inert layer disposed between said at least one magnetic layer and said pole structure; and a second inert layer disposed between said at least one magnetic layer and said pedestal structure wherein said second inert layer comprises a layer of rhodium (Rh).

7. The magnetic recording head of claim 6 wherein said first inert layer comprises a laminate of rhodium (Rh) and tantalum (Ta).

8. The magnetic recording head of claim 6 wherein said at least one magnetic layer comprises a layer of cobalt iron (CoFe).

9. The magnetic recording head of claim 6 wherein a throat height of said write gap structure is less than the throat height of said magnetic recording head.

10. A magnetic recording head comprising:

a pole structure;

a pedestal structure;

a laminated write gap structure disposed between said pole structure and said pedestal structure, said laminated write gap structure comprising at least one magnetic layer disposed proximate to said pedestal structure and wherein a throat height of said laminated write gap structure is less than a throat height of said pedestal structure; and a second inert layer disposed between said at least one magnetic layer and said pedestal structure wherein said laminated write gap structure further comprises an inert layer disposed between said at least one magnetic layer and said pole structure wherein said inert layer comprises a laminate of rhodium (Rh) and tantalum (Ta).

11. The magnetic recording head of claim 10 wherein said at least one magnetic layer comprises cobalt iron (CoFe).

* * * * *